(12) United States Patent
Lee et al.

(10) Patent No.: US 7,292,430 B2
(45) Date of Patent: Nov. 6, 2007

(54) MULTI-LAYER CHIP CAPACITOR

(75) Inventors: Byoung Hwa Lee, Kyungki-do (KR); Chang Hoon Shim, Kyungki-do (KR); Kyong Nam Hwang, Kyungki-do (KR); Dong Seok Park, Seoul (KR); Sang Soo Park, Kyungki-do (KR); Min Cheol Park, Kyungki-do (KR)

(73) Assignee: Samsung Electro-Mechanics Co., Ltd. (KR)

( * ) Notice: Subject to any disclaimer, the term of this patent is extended or adjusted under 35 U.S.C. 154(b) by 0 days.

(21) Appl. No.: 11/272,877

(22) Filed: Nov. 15, 2005

(65) Prior Publication Data

US 2006/0120018 A1   Jun. 8, 2006

(30) Foreign Application Priority Data

Dec. 3, 2004   (KR) .................. 10-2004-0101411

(51) Int. Cl.
*H01G 4/228* (2006.01)
(52) U.S. Cl. ................ 361/306.3; 361/306.1; 361/321.2; 361/321.4; 361/311; 361/313
(58) Field of Classification Search ............ 361/306.1, 361/306.2, 306.3, 311–313, 307, 308.1, 321.1, 361/321.2, 321.4
See application file for complete search history.

(56) References Cited

U.S. PATENT DOCUMENTS

| 5,880,925 | A | 3/1999 | DuPré et al. | |
| 6,243,253 | B1* | 6/2001 | DuPre et al. | ............ 361/306.3 |
| 6,407,907 | B1* | 6/2002 | Ahiko et al. | ............ 361/306.3 |
| 6,496,355 | B1* | 12/2002 | Galvagni et al. | ........ 361/306.3 |
| 6,542,352 | B1* | 4/2003 | Devoe et al. | ............ 361/306.3 |

FOREIGN PATENT DOCUMENTS

| KR | 2003-0064887 | 8/2003 |
| WO | WO 02/054421 A2 | 7/2002 |

OTHER PUBLICATIONS

Korean Office Action Issued in corresponding Korean Patent Application No. KR 10-2004-0101411, dated Oct. 25, 2006.

* cited by examiner

*Primary Examiner*—Nguyen T. Ha
(74) *Attorney, Agent, or Firm*—McDermott Will & Emery LLP (57) ABSTRACT

A multi-layer chip capacitor includes a capacitor body; first and second internal electrodes alternately arranged therein and separated by dielectric layers, each of the internal electrodes having at least one opening formed at one or more sides thereof; first and second conductive vias passing through the openings and electrically connected to the first and second internal electrodes, respectively; first and second terminal electrodes of opposite polarities formed on one or more side faces of the capacitor body; and first and second lowermost electrode patterns being coplanar, each pattern including a via contact portion and a lead portion extending therefrom. The first and second lowermost electrode patterns are connected to the first and second terminal electrodes, respectively, through the respective lead portions of the lowermost patterns.

18 Claims, 9 Drawing Sheets

MULTI-LAYER CHIP CAPACITOR

RELATED APPLICATION

The present invention is based on, and claims priority from, Korean Application Number 2004-101411, filed Dec. 3, 2004, the disclosure of which is incorporated by reference herein in its entirety.

BACKGROUND OF THE INVENTION

1. Field of the Invention

The present invention relates to a multi-layer chip capacitor, and more particularly to a multi-layer chip capacitor having a reduced equivalent serial inductance (ESL) and suitably used in a high-frequency circuit.

2. Description of the Related Art

Generally, a multi-layer chip capacitor (MLCC) comprises a plurality of dielectric layers, referred to as "ceramic green sheets", and internal electrodes interposed between the dielectric layers. The multi-layer chip capacitor has a small size and a high capacitance, and is easily mounted on a substrate, thus being used as a capacity component of various electric apparatuses. Particularly, the multi-layer chip capacitor is used as a decoupling capacitor arranged in a power supply circuit of an LSI.

In order to prevent the rapid fluctuation of current and stabilize the power circuit, the multi-layer chip capacitor used as the decoupling capacitor must have a low ESL. The above requirement is increased according to the high-frequency and high-current trends of the electric apparatuses. Conventionally, in order to reduce the ESL of the multi-layer chip capacitor, U.S. Pat. No. 5,880,925 proposes that respective lead structures of first internal electrodes are located adjacent respective lead structures of second internal electrodes in an interdigitated arrangement. One example of such an arrangement is shown in FIG. 1a.

Figure 1A:
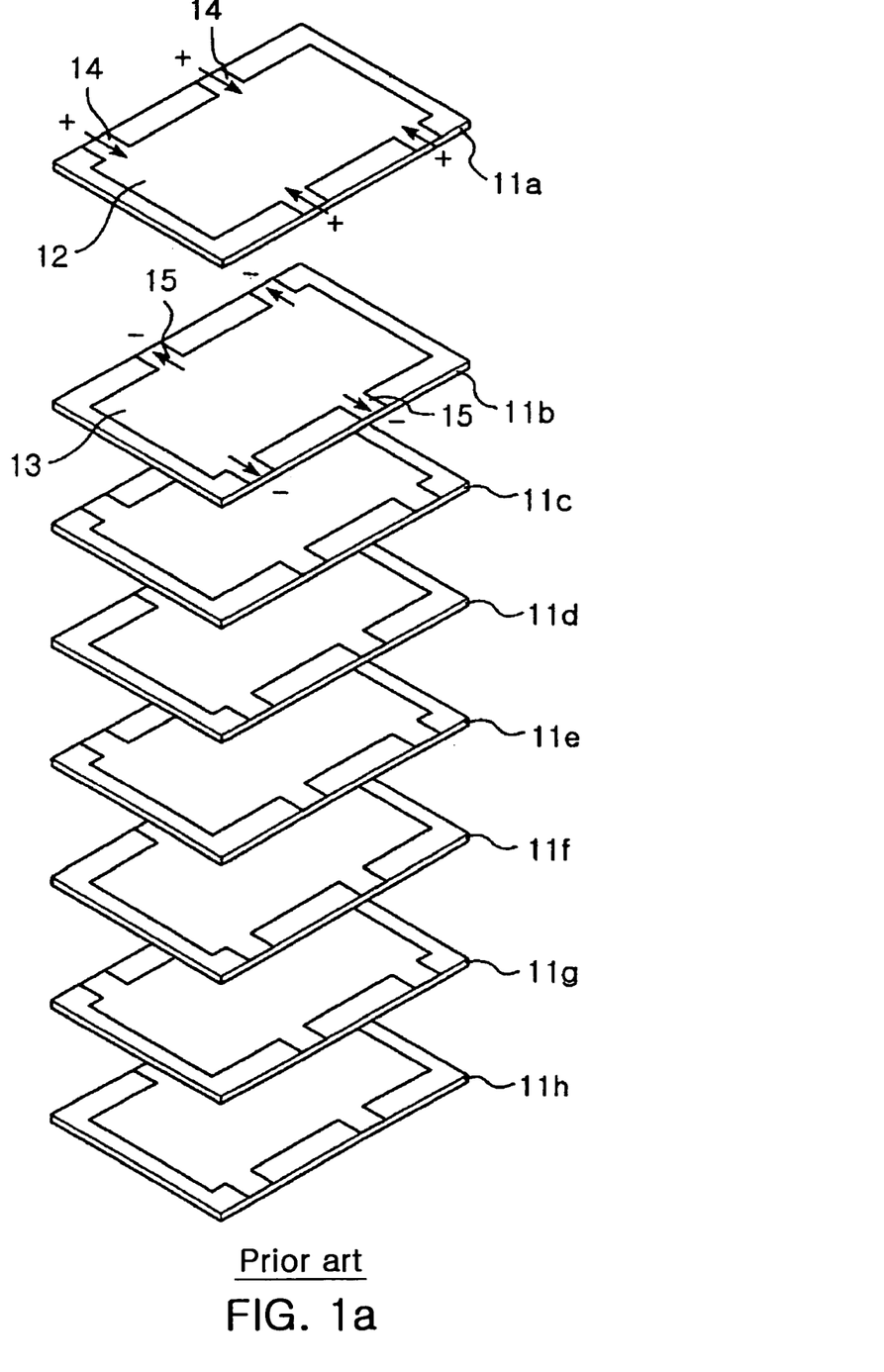
FIG. 1a is an exploded perspective view illustrating a plurality of dielectric layers and internal electrodes employed by a conventional multi-layer chip capacitor.
Figure 1B:
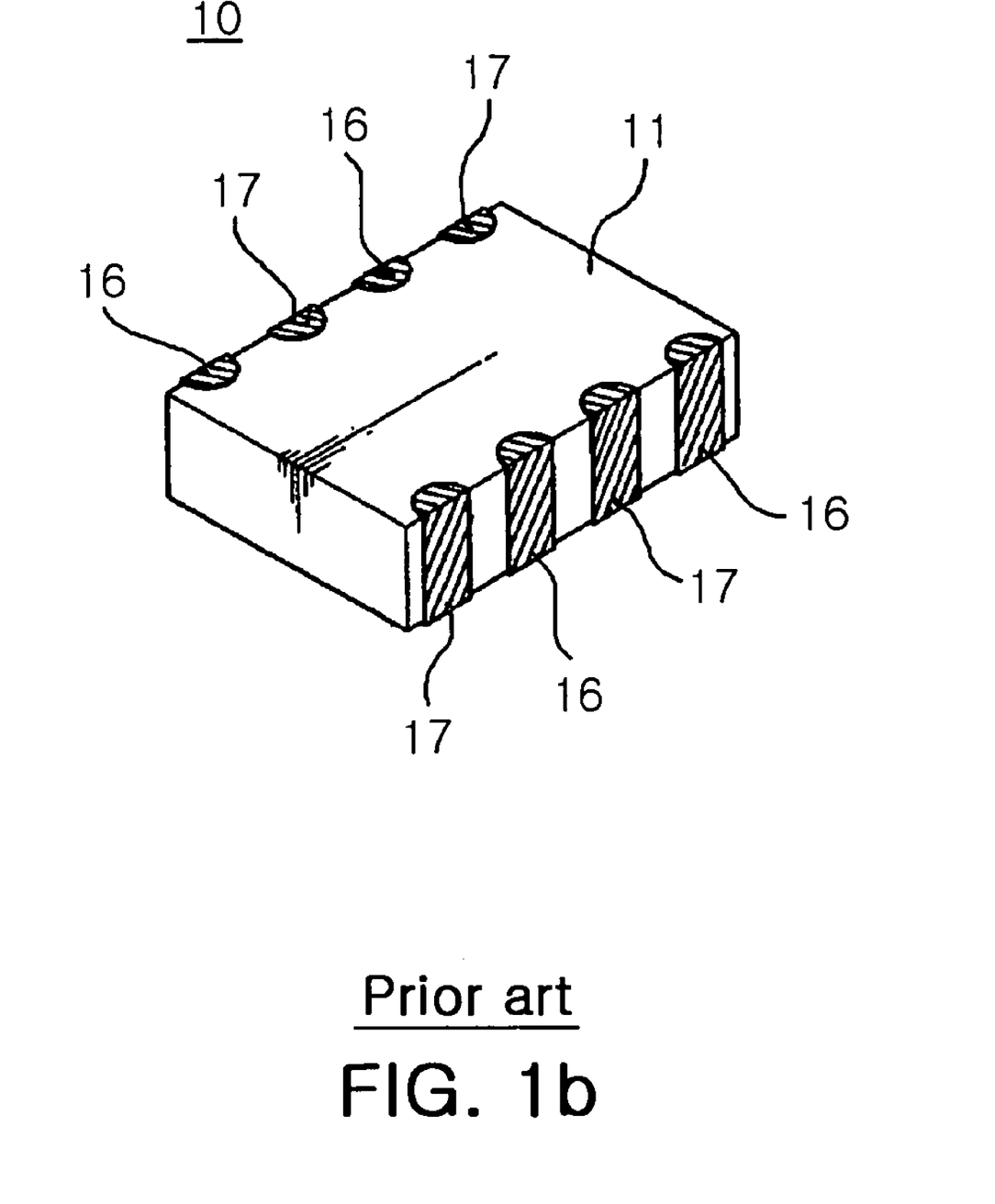
FIG. 1b is a perspective view of the conventional multi-layer chip capacitor.

FIG. 1a is an exploded perspective view illustrating a plurality of dielectric layers and internal electrodes employed by a conventional multi-layer chip capacitor. FIG. 1b is a schematic perspective view of the conventional multi-layer chip capacitor manufactured using the internal electrodes of FIG. 1a. With reference to FIG. 1a, a first internal electrode 12 or a second internal electrode 13 is formed on each of a plurality of dielectric sheets 11a to 11h referred to as "ceramic green sheets". The first and second internal electrodes 12 and 13 have polarities different from each other. The dielectric layers 11a to 11h provided with the internal electrodes 12 and 13 are stacked, thereby producing a capacitor body 11 of a capacitor 10 (See FIG. 1b).

With reference to FIGS. 1a and 1b, leads 14 of the first internal electrodes 12 and leads 15 of the second internal electrodes 13 are connected to respective ones of terminal electrodes 16 and 17. The leads 14 of the first internal electrodes 12 are located adjacent the leads 15 of the second internal electrodes 13 in an interdigitated arrangement. Since the polarities of the voltages supplied to the nearby leads 14 and 15 differ, the magnetic fluxes generated due to the high frequency currents flowing from the terminal electrodes 16 and 17 are canceled out between theses adjoining leads 14 and 15. Therefore, the ESL is reduced.

However, it is difficult to sufficiently reduce the ESL of the above conventional multi-layer chip capacitor. Although the interdigitated arrangement of the leads is used, the ESL reduction effect is partially acquired only between the adjoining leads. The lead structure itself acts as a significant factor increasing the ESL of the capacitor.

SUMMARY OF THE INVENTION

Therefore, the present invention has been made in view of the above problems, and it is an object of the present invention to provide a multi-layer chip capacitor having a further reduced ESL, in which internal electrodes having the same polarity are connected through conductive vias instead of leads.

In accordance with the present invention, the above and other objects can be accomplished by the provision of a multi-layer chip capacitor comprising: a capacitor body formed by stacking a plurality of dielectric layers; a plurality of first and second internal electrodes respectively formed on the dielectric layers, the first and second internal electrodes being separated by the dielectric layers and alternately arranged inside the capacitor body, wherein each of the internal electrodes has at least one opening formed at one or more sides thereof; first and second conductive vias, vertically extended to pass through the openings of the second and first internal electrodes, respectively, so as not to contact peripheral edges of the openings, the first and second conductive vias being electrically connected to the first and second internal electrodes, respectively; first and second terminal electrodes formed on one or more side faces of the capacitor body, the first and second terminal electrodes having a first polarity and a second polarity opposite to the first polarity, respectively; and first and second lowermost electrode patterns being coplanar on a dielectric layer inside the capacitor body, each of the patterns including a via contact portion and a lead portion extending therefrom, the first and second lowermost electrode patterns being electrically connected to the first and second terminal electrodes of the opposite polarities, respectively, through the respective lead portions of the lowermost electrode patterns. The first and second conductive vias are in contact with the via contact portions of the first and second lowermost electrode patterns, respectively, and electrically connected to the first and second terminal electrodes through the first and second lowermost electrode patterns, respectively.

According to an embodiment of the present invention, each of the first and second internal electrodes has the openings of the same number formed at two opposite sides thereof, and the openings of the first internal electrodes are adjacent to and alternate with the openings of the second internal electrodes. Each of the first and second internal electrodes may have four openings formed at the two opposite sides thereof.

According to another embodiment of the present invention, each of the first and second internal electrodes has the openings of the same number formed at three sides thereof, and the openings of the first internal electrodes are adjacent to and alternate with the openings of the second internal electrodes. In this case, one side out of the three sides of the first internal electrode may be opposite to one side out of the three sides of the second internal electrode. Further, the total number of the openings formed at the three sides may be five. For example, two openings are formed at each of two opposite sides out of the three sides of each of the first and second internal electrodes, and one opening is formed at the remaining one side out of the three sides of each of the first and second internal electrodes.

According to yet another embodiment of the present invention, each of the first and second internal electrodes has the openings of the same number formed at four sides thereof, and the openings of the first internal electrodes are adjacent to and alternate with the openings of the second internal electrodes. In this case, the total number of the openings formed at the four sides may be six. For example, two openings are formed at each of two opposite sides out of the four, and one opening is formed at each of the remaining opposite two sides out of the four sides.

According to an embodiment, the total number of the terminal electrodes is eight. In this case, four terminal electrodes may be formed at each of two opposite sides of the capacitor body.

According to another embodiment, the total number of the terminal electrodes is ten. In this case, four terminal electrodes may be formed at each of two opposite two sides of the capacitor body, and one terminal electrode may be formed at each of the remaining two opposite sides of the capacitor body.

According to yet another embodiment, the total number of the terminal electrodes is twelve. In this case, four terminal electrodes may be formed at each of two opposite sides of the capacitor body, and two terminal electrodes may be formed at each of the remaining two opposite sides of the capacitor body.

The multi-layer chip capacitor may further comprise uppermost electrode patterns having the same pattern shape as that of the lowermost electrode patterns. In this case, the uppermost electrode patterns respectively include via contact portions contacting the conductive vias, and lead portions connected to the terminal electrodes. Accordingly, the conductive vias contact the via contact portions of the lowermost and uppermost electrode patterns, and are connected to the terminal electrodes through the lead portions.

In the present invention, instead of using leads of the internal electrodes, the internal electrodes having the same polarity are connected to each other using the openings and the conductive vias, and the conductive vias are connected to the terminal electrodes using the lowermost electrode patterns. Thereby, the internal electrodes do not require leads, thus completely eliminating parasitic inductance generated due to the leads of the internal electrodes. Further, the parasitic inductance is not generated by the vertically extended conductive vias, or, even if a small amount of the parasitic inductance is generated by the conductive vias, the parasitic inductance is offset by alternately arranging the conductive vias having different polarities.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Now, preferred embodiments of the present invention will be described in detail with reference to the annexed drawings. The embodiments may be variously modified, but do not limit the scope and spirit of the invention. The embodiments have been made only for a better understanding of the present invention. Accordingly, shapes and sizes of elements of the drawings may be enlarged for more clear description, and the same or similar elements are denoted by the same reference numerals even though they are depicted in different drawings.

Figure 2:
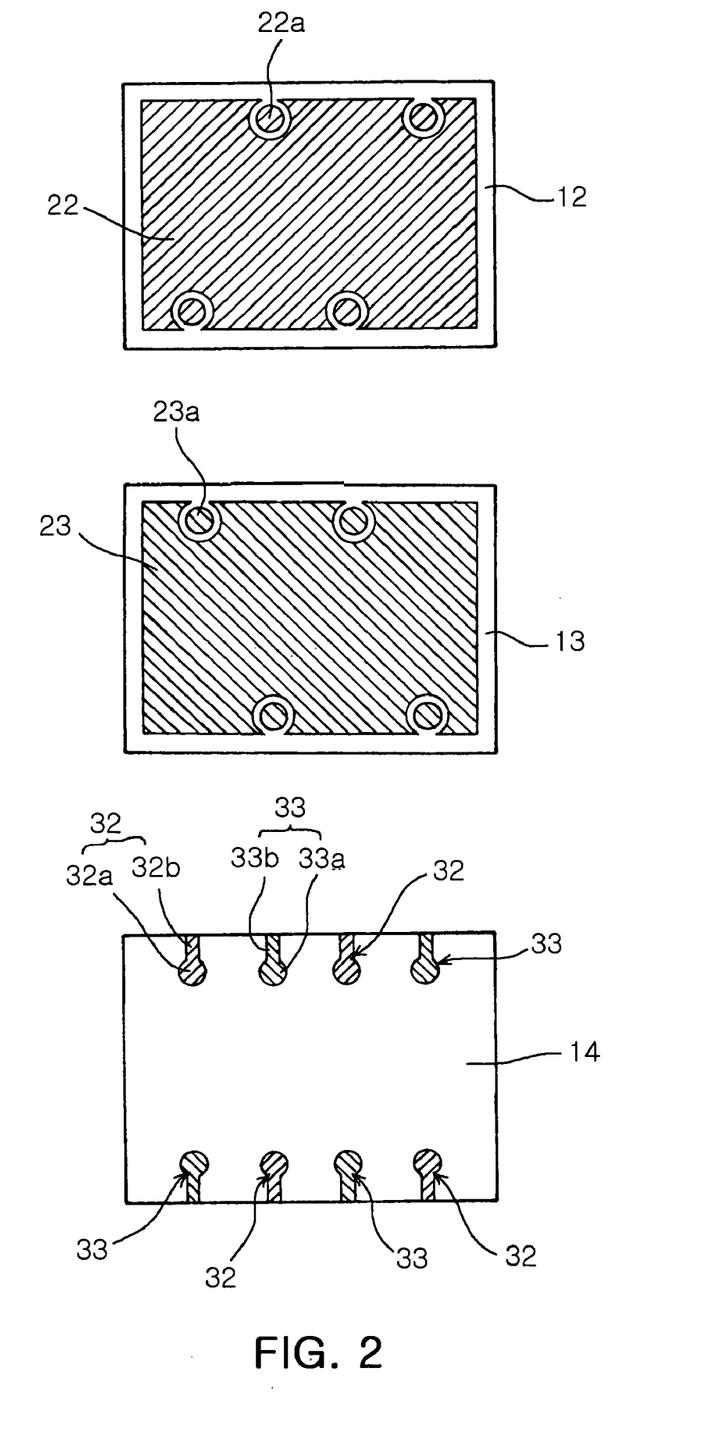
FIG. 2 is a plan view illustrating a first internal electrode, a second internal electrode, and the lowermost electrode of a multi-layer chip capacitor in accordance with one embodiment of the present invention.

FIG. 2 is a plan view illustrating a first internal electrode, a second internal electrode, and the lowermost electrode of a multi-layer chip capacitor in accordance with one embodiment of the present invention. With reference to FIG. 2, a first internal electrode 22 and a second internal electrode 23 are respectively formed on two dielectric layers 12 and 13. The first and second internal electrodes 22 and 23 are formed by screen-printing conductive paste on the dielectric layers 12 and 13. The two dielectric layers 12 and 13 are two neighboring dielectric layers out of a plurality of dielectric layers of the multi-layer chip capacitor. In order to form the entire structure of the body of the multi-layer chip capacitor, the above two dielectric layers 12 and 13 are alternately stacked repeatedly.

As shown in FIG. 2, the internal electrodes 22 and 23 do not have lead structures. Instead, two openings are formed at each of two opposite sides of the internal electrodes 22 and 23. The openings formed through the first internal electrode 22 are adjacent to the openings formed through the second internal electrode 23, and alternate with the openings formed through the second internal electrode 23. That is, the openings of the second internal electrode 23 are separated from the corresponding openings of the first internal electrode 22 by a designated distance so that the openings of the first internal electrode 22 do not coincide with the openings of the second internal electrode 23. Conductive via layers 22a and 23a passing through the dielectric layers 12 and 13 are formed in the openings. When the capacitor body is formed by alternately stacking the dielectric layers 12 and 13 provided with the internal electrodes 22 and 23 formed thereon, the conductive via layers 22a and 23a form conductive vias, which are vertically extended through the dielectric layers 12 and 13. The conductive via layers 22a and 23a do not contact peripheral edges of the openings formed through the internal electrodes 22 and 23.

For example, the conductive via layers 22a do not contact the first internal electrode 22, but contact the electrode surface of the second internal electrode 23. Further, the conductive via layers 22a are vertically extended to pass through the dielectric layer 12 and 13. Accordingly, conductive vias 22a passing through the openings of the first internal electrodes 22 are not connected to the first internal electrodes 22, but are connected to all the second internal electrodes 23. In the same manner, conductive vias 23a passing through the openings of the second internal electrodes 23 are connected only to all the first internal electrodes 22.

In addition to the first internal electrodes 22 and the second internal electrodes 23, the multi-layer chip capacitor of the present invention further comprises the lowermost electrode patterns 32 and 33 for connecting the conductive vias to terminal electrodes. That is, as shown in FIG. 2, the lowermost electrode patterns 32 and 33 including via contact portions 32a and 33a and lead portions 32b and 33b formed on a dielectric layer 14 are disposed under the lowermost internal electrode. The via contact portions 32a and 33a of the lowermost electrode patterns 32 and 33 respectively contact the conductive vias 23a and 22a connected to the first internal electrodes 22 and the second internal electrodes 23. Further, the via contact portions 32a and 33a are connected to the terminal electrodes (26 and 27 of FIG. 3b) through the lead portions 32b and 33b, respectively.

Figure 3A:
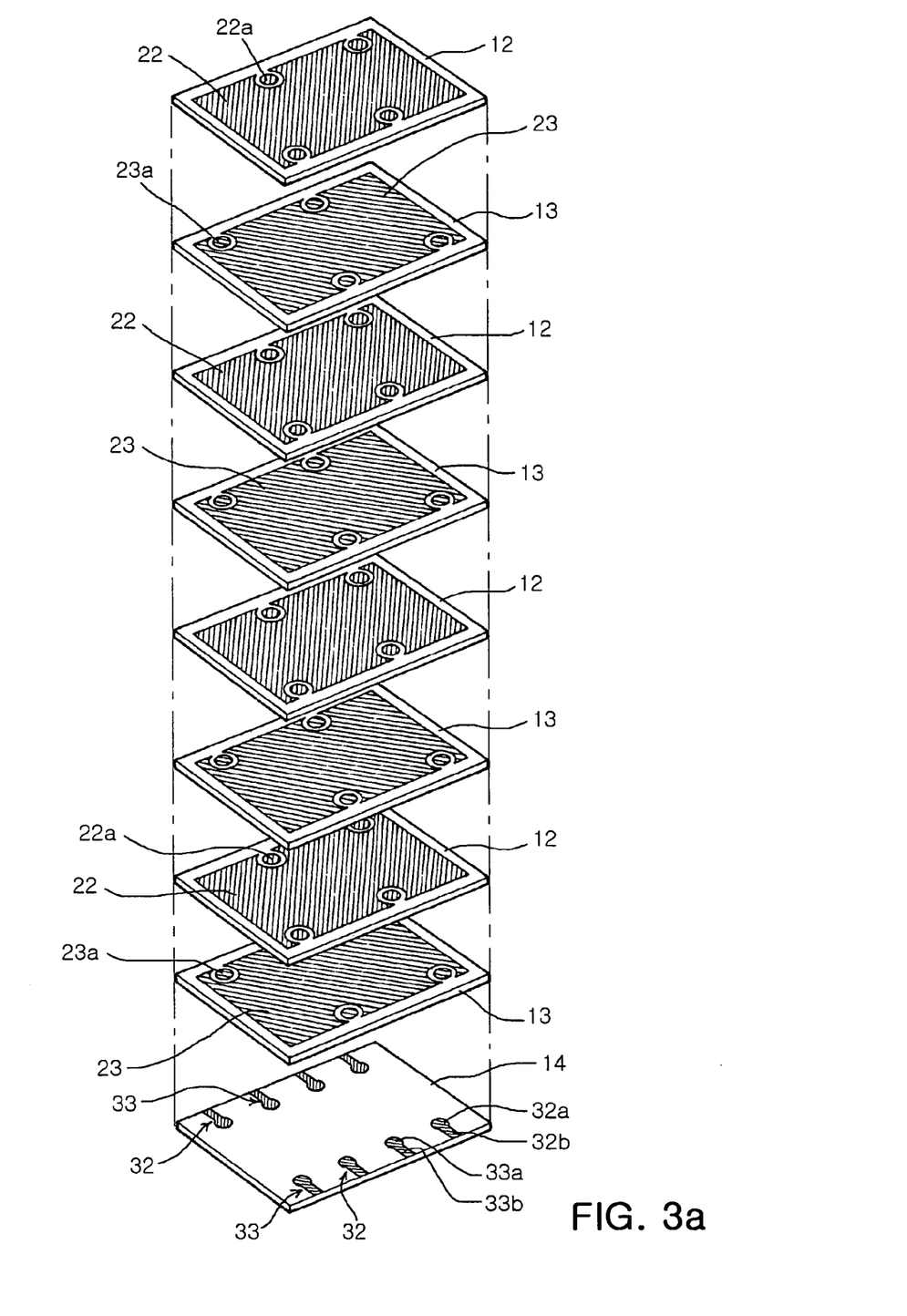
FIG. 3a is an exploded perspective view a plurality of dielectric layers and internal electrodes employed by the multi-layer chip capacitor in accordance with one embodiment of the present invention.

FIG. 3a is an exploded perspective view illustrating the dielectric layers 12, 13, and 14, the internal electrodes 22 and 23, and the lowermost electrode patterns 32 and 33. As shown in FIG. 3a, a plurality of the first internal electrodes 22 provided with the openings formed therethrough and a plurality of the second internal electrodes 23 provided with the openings formed therethrough are alternately stacked. The conductive via layers 22a and 23a are respectively formed in the openings of the first and second internal electrodes 22 and 23 such that the conductive via layers 22a and 23a do not contact the peripheral edges of the openings of the internal electrode 22 and 23. For example, the conductive via layers 22a pass through the dielectric layer 12, and contact the electrode surface of the internal electrode 23. Conductive via layers (not shown) are formed to pass through the dielectric layer 13 at the region where the conductive via layers 22a contact the internal electrode 23. Accordingly, the conductive vias vertically extended to pass through all the dielectric layers 12 and 13 are obtained.

The conductive vias 23a and 22a contact the via contact portions 32a and 33a of the lowermost electrode patterns 32 and 33. The conductive vias are connected to the terminal electrodes through the lead portions 32b and 33b of the lowermost electrode patterns 32 and 33. Since the openings of the first internal electrodes 22 alternate with the openings of the second internal electrodes 23 such that the openings of the first internal electrodes 22 are adjacent to the openings of the second internal electrodes 23, each of the conductive vias is connected to either the first internal electrodes 22 or the second internal electrodes 23. A plurality of the first internal electrodes 22, and the conductive vias 23a and the terminal electrodes 26 connected thereto exhibit one polarity (for example, the positive polarity (+)), and a plurality of the second internal electrodes 23, and the conductive vias 22a and the terminal electrodes 27 connected thereto exhibit the other polarity (for example, the negative polarity (−)). The first and second internal electrodes 22 and 23 do not have leads. The internal electrodes 22 or 23 having the same polarity are connected with each other through the conductive vias. The internal electrodes 22 or 23 having the same polarity are connected to the terminal electrodes 26 or 27 having the same polarity through (the via contact portions 32a or 33a and the lead portions 32b or 33b of) the lowermost electrode patterns 32 or 33 and the conductive vias 23a or 22a. Thereby, a multi-layer chip capacitor, in which a number of capacitors are connected in parallel, is manufactured. In accordance with this embodiment, the multi-layer chip capacitor has a reduced parasitic inductance by eliminating leads, which cause the increase in ESL, from the internal electrodes. Further, the openings of the first internal electrodes alternate with the openings of the second internal electrodes such that the openings of the first internal electrodes are adjacent to the corresponding openings of the second internal electrodes, the conductive vias having different polarities alternate with each other, thereby further reducing the parasitic inductance of the multi-layer chip capacitor.

Figure 3B:
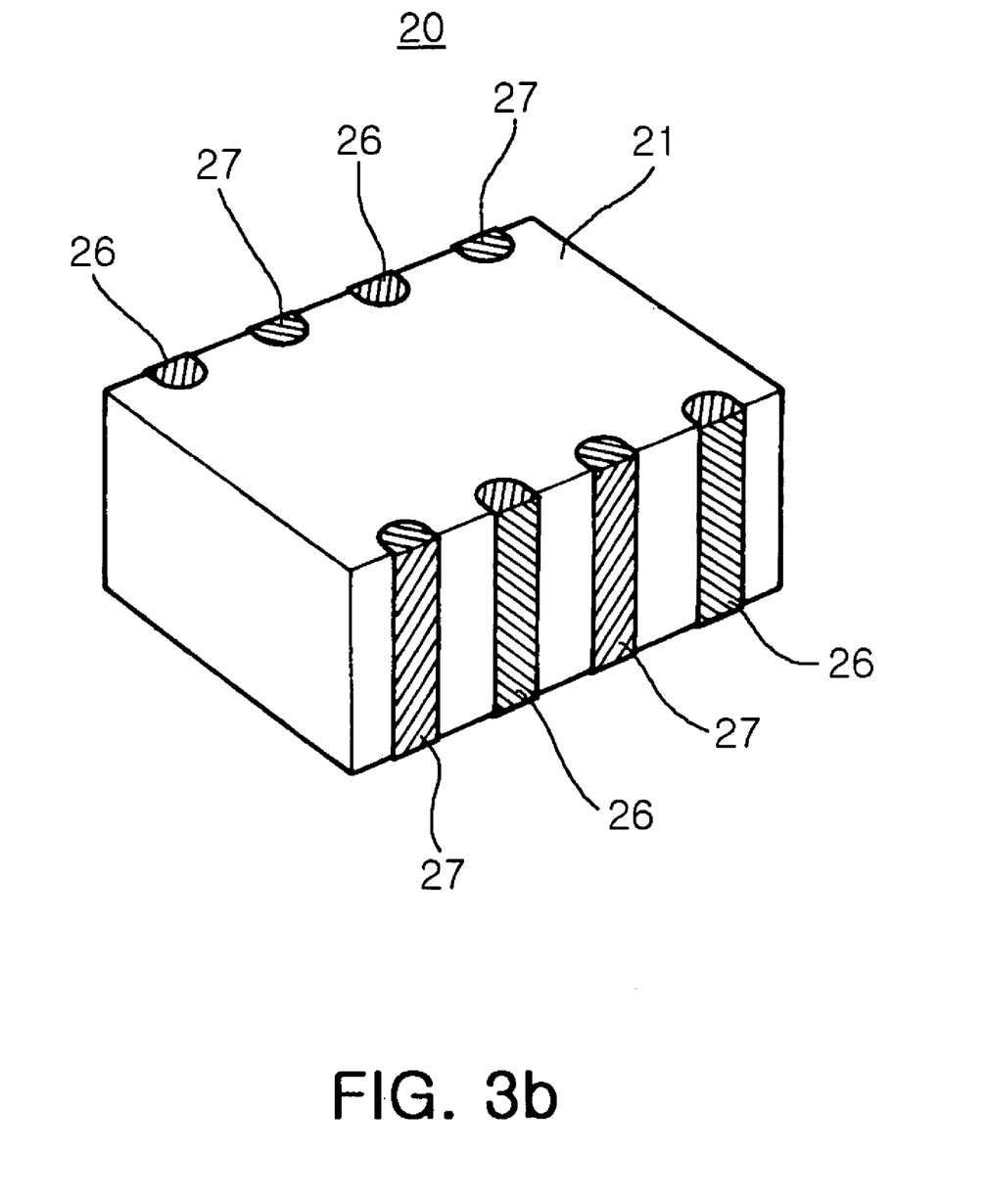
FIG. 3b is a perspective view of the multi-layer chip capacitor in accordance with one embodiment of the present invention.

FIG. 3b is a perspective view of the multi-layer chip capacitor in accordance with one embodiment of the present invention. The capacitor 20 shown in FIG. 3b is manufactured by stacking the dielectric layers 12, 13 and 14 respectively provided with the electrodes 22, 23, 32 and 33 shown in FIG. 3a, pressing and sintering the obtained structure, and forming terminal electrodes on the structure. With reference to FIG. 3b, the dielectric layers 12, 13, and 14 provided with the internal electrodes 22 and 23 and the lowermost electrode patterns 32 and 33 as shown in FIG. 3a are stacked, thereby producing a capacitor body 21. The terminal electrodes 26 and 27 connected to the lead portions 32b and 33b of the lowermost electrode patterns 32 and 33 are formed on the outer surface of the capacitor body 21. Thereby, the manufacture of the multi-layer chip capacitor 20 having a low ESL as shown in FIG. 3b is completed.

Here, since the conductive vias 23a for connecting all the first internal electrodes (22 of FIG. 3a) are connected to the terminal electrodes 26 through the via contact portions 32a and the lead portions 32b of the lowermost electrode patterns 32, the four terminal electrodes 26 have the same polarity. Similarly, since the conductive vias 22a for connecting all the second internal electrodes 23 are connected to the terminal electrodes 27 through the via contact portions 33a and the lead portions 33b of the lowermost electrode patterns 33, the four terminal electrodes 27 have the same polarity. Consequently, in accordance with this embodiment, the eight-terminal multi-layer chip capacitor 20 having the four positive (+) terminal electrodes and the four negative (−) terminal electrodes is manufactured.

In the above-described embodiment, the via contact portions and the lead portions connected to the conductive vias are formed only in the lowermost electrode patterns. However, the uppermost electrode patterns having the same pattern shape as that of the lowermost electrode patterns may be further provided. That is, a dielectric layer, on which the uppermost electrode patterns (not shown) are formed, may be stacked on the uppermost internal electrode. Here, the same as the lowermost electrode patterns, the uppermost electrode patterns include via contact portions and lead portions contacting the conductive vias. The lead portions of the uppermost electrode patterns are connected to the terminal electrodes 26 and 27. Accordingly, the internal electrodes of the same polarity are connected with each other through the conductive vias between the uppermost and lowermost electrode patterns, and the conductive vias are connected to the terminal electrodes through the lead portions of the uppermost and lowermost electrode patterns.

Figure 4A:
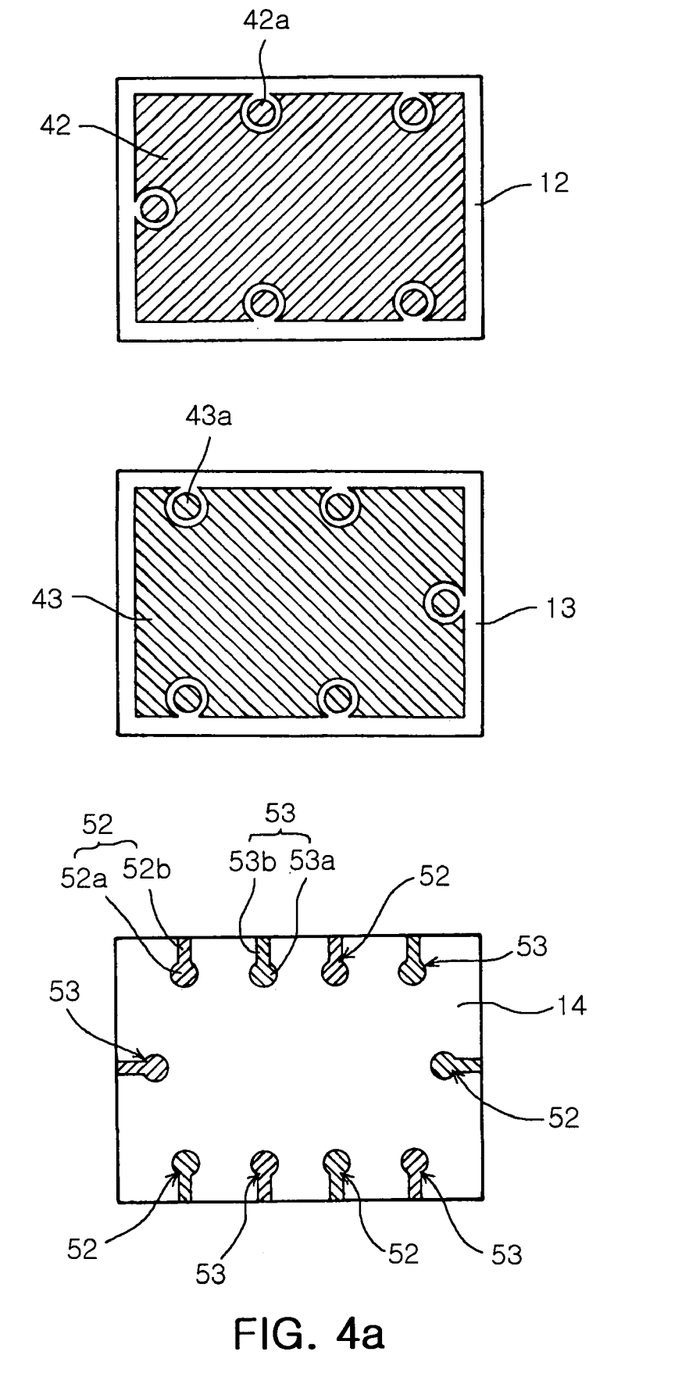
FIG. 4a is a plan view illustrating a first internal electrode, a second internal electrode, and the lowermost electrode of a multi-layer chip capacitor in accordance with another embodiment of the present invention.

FIG. 4a is a plan view illustrating a first internal electrode, a second internal electrode, and the lowermost electrode of a multi-layer chip capacitor in accordance with another embodiment of the present invention. In the multi-layer chip capacitor shown in FIG. 4a, each of the internal electrodes 42 and 43 has one more openings formed at another side in addition to the two opposite sides thereof. Accordingly, the multi-layer chip capacitor of this embodiment further comprises additional two conductive vias and additional two terminal electrodes, compared to the multi-layer chip capacitor of the earlier embodiment with reference to FIG. 2.

With reference to FIG. 4a, a first internal electrode 42 provided with openings formed therethrough and a second internal electrode 43 provided with openings formed therethrough are respectively formed on the dielectric layers 12 and 13. Openings are formed at three sides of each of the first and second internal electrodes 42 and 43. Two openings are formed at two opposite sides of each of the first and second internal electrodes 42 and 43, and one opening is formed at a third side of each of the first and second internal electrodes 42 and 43. The openings of the first internal electrode 42 alternate with the openings of the second internal electrode 43 such that the openings of the first internal electrode 42 are adjacent to the openings of the second internal electrode 43. Conductive via layers 42a are formed in the openings of the first internal electrode 42 such that the conductive via layers 42a do not contact peripheral edges of the openings of the first internal electrode 42. The conductive via layers 42a pass through the dielectric layers 12, and contact the electrode surfaces of the second internal electrodes 43. The conductive via layers 42a are vertically extended to form conductive vias having one polarity, and the conductive vias of the one polarity are connected only to the second internal electrodes 43. Similarly, conductive via layers 43a are vertically extended to form conductive vias having the other polarity, and the conductive vias of the other polarity are connected only to the first internal electrodes 42. These conductive vias 43a and 42a are connected to via contact portions 52a and 53a of the lowermost electrode patterns 52 and 53 formed on the dielectric layer 14, and connected to terminal electrodes (46 and 47 of FIG. 4b) through lead portions 52b and 53b.

Figure 4B:
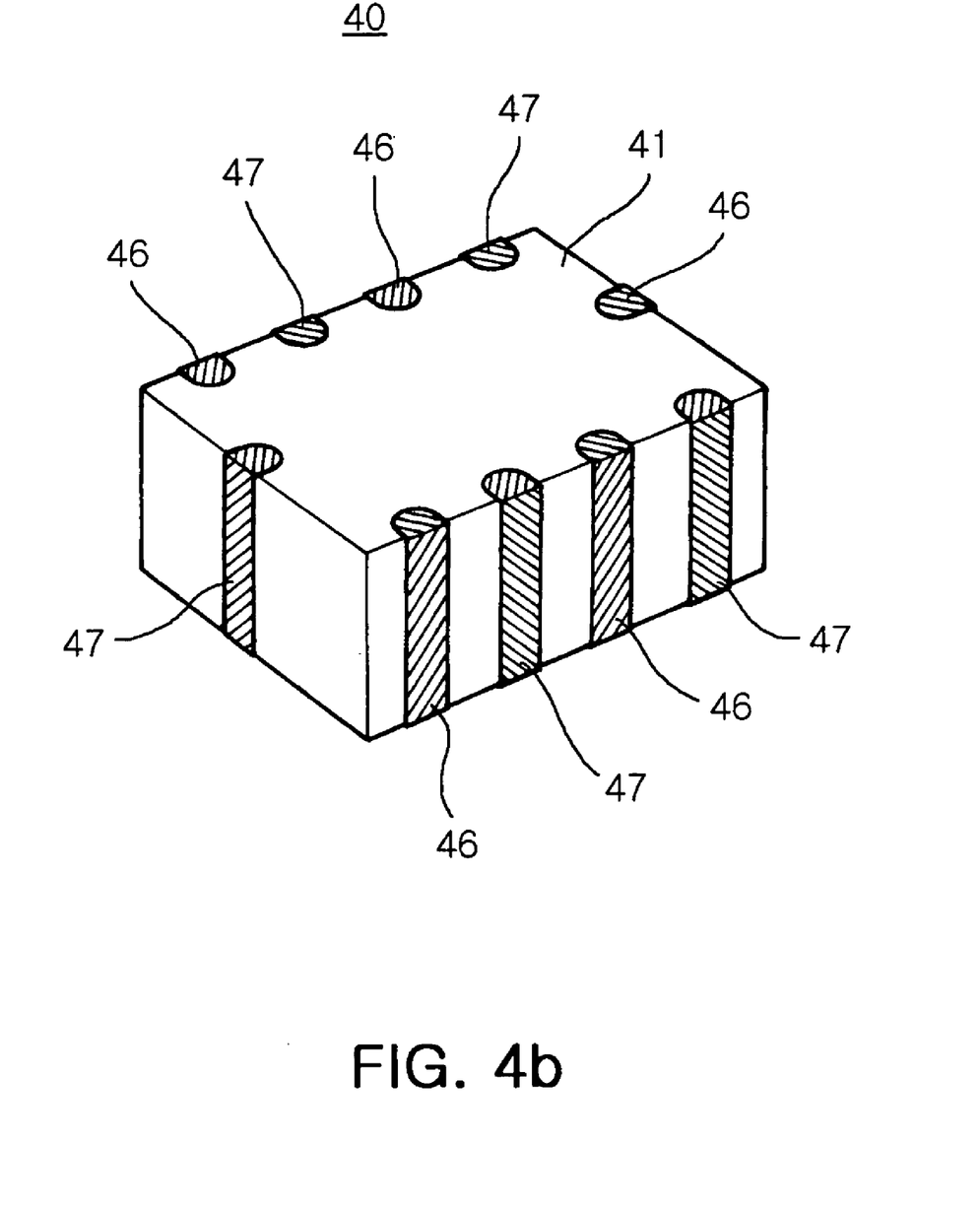
FIG. 4b is a perspective view of the multi-layer chip capacitor in accordance with another embodiment of the present invention.

FIG. 4b is a perspective view of the multi-layer chip capacitor 40 manufactured by the dielectric layers 12, 13, and 14 respectively provided with the electrodes 42, 43, 52, and 53. As shown in FIG. 4b, ten terminal electrodes 46 and 47 are formed on a capacitor body 41. The terminal electrodes 46 having one polarity are connected to the lead portions 52b of the lowermost electrode pattern 52 of FIG. 4a, and the terminal electrodes 47 having the other polarity are connected to the lead portions 53b of the lowermost electrode pattern 53 of FIG. 4a. Thereby, the ten-terminal multi-layer chip capacitor 40 having the five positive (+) terminal electrodes and the five negative (−) terminal electrodes is manufactured. Similarly to the multi-layer chip capacitor 20 of the earlier embodiment, the multi-layer chip capacitor 40 of this embodiment has a reduced parasitic inductance by eliminating leads from the internal electrodes. Further, the conductive vias having different polarities alternate with each other such that the conductive vias having one polarity are adjacent to the conductive vias having the other polarity, thereby further reducing the parasitic inductance of the multi-layer chip capacitor. As described above, the ten-terminal multi-layer chip capacitor of this embodiment may further comprise the uppermost electrode patterns having the same pattern shape as that of the lowermost electrode patterns.

Figure 5A:
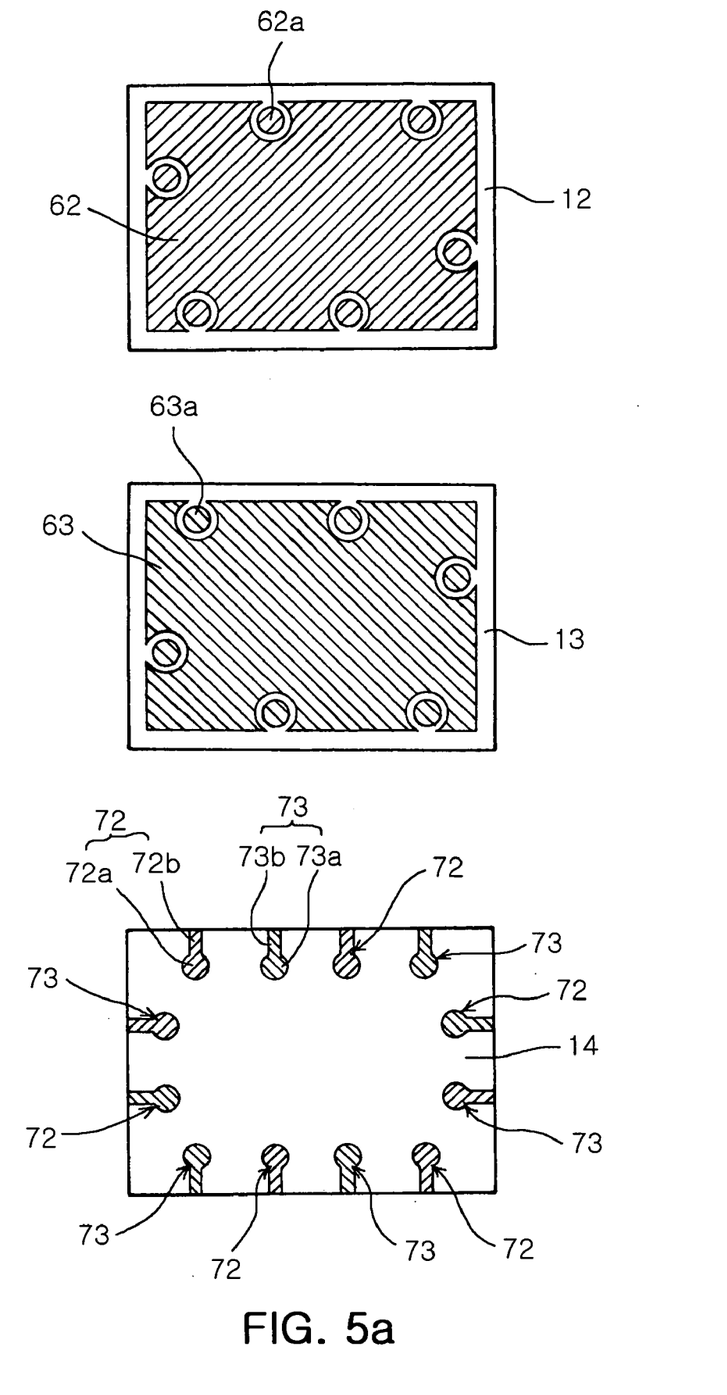
FIG. 5a is a plan view illustrating a first internal electrode, a second internal electrode, and the lowermost electrode of a multi-layer chip capacitor in accordance with yet another embodiment of the present invention.

FIG. 5a is a plan view illustrating a first internal electrode, a second internal electrode, and the lowermost electrode of a multi-layer chip capacitor in accordance with yet another embodiment of the present invention. With reference to FIG. 5a, each of the first and second internal electrodes 62 or 63 has openings formed at all four sides thereof. Specifically, two openings are formed at each of two opposite sides of each internal electrode 62 or 63, and one opening is formed at each of the other opposite two sides of each internal electrode 62 or 63. Accordingly, the multi-layer chip capacitor of this embodiment further comprises additional four openings and additional four terminal electrodes, compared to the multi-layer chip capacitor of the earlier embodiment with reference to FIG. 2. Thereby, a twelve-terminal multi-layer chip capacitor is obtained.

Similarly to the earlier embodiments, in this embodiment, conductive via layers 62a and 63a are formed in the openings of the first and second internal electrodes 62 and 63 such that the conductive via layers 62a and 63a do not contact peripheral edges of the openings. The conductive via layers 62a and 63a pass through the dielectric layers 12 and 13, and respectively contact the internal electrodes 63 and 62 of the same polarity as that of the conductive via layers 62a and 63a. The conductive via layers 62a and 63a are vertically extended to form conductive vias. The conductive vias are connected only to the internal electrodes 63 and 62 having polarities the same as those of the conductive vias, and contact via contact portions 72a and 73a of the lowermost electrode patterns 72 and 73 formed on the dielectric layer 14. The conductive vias contacting the via contact portions 72a and 73a are connected to terminal electrodes (66 and 67 of FIG. 5b) through lead portions 72b and 73b.

Figure 5B:
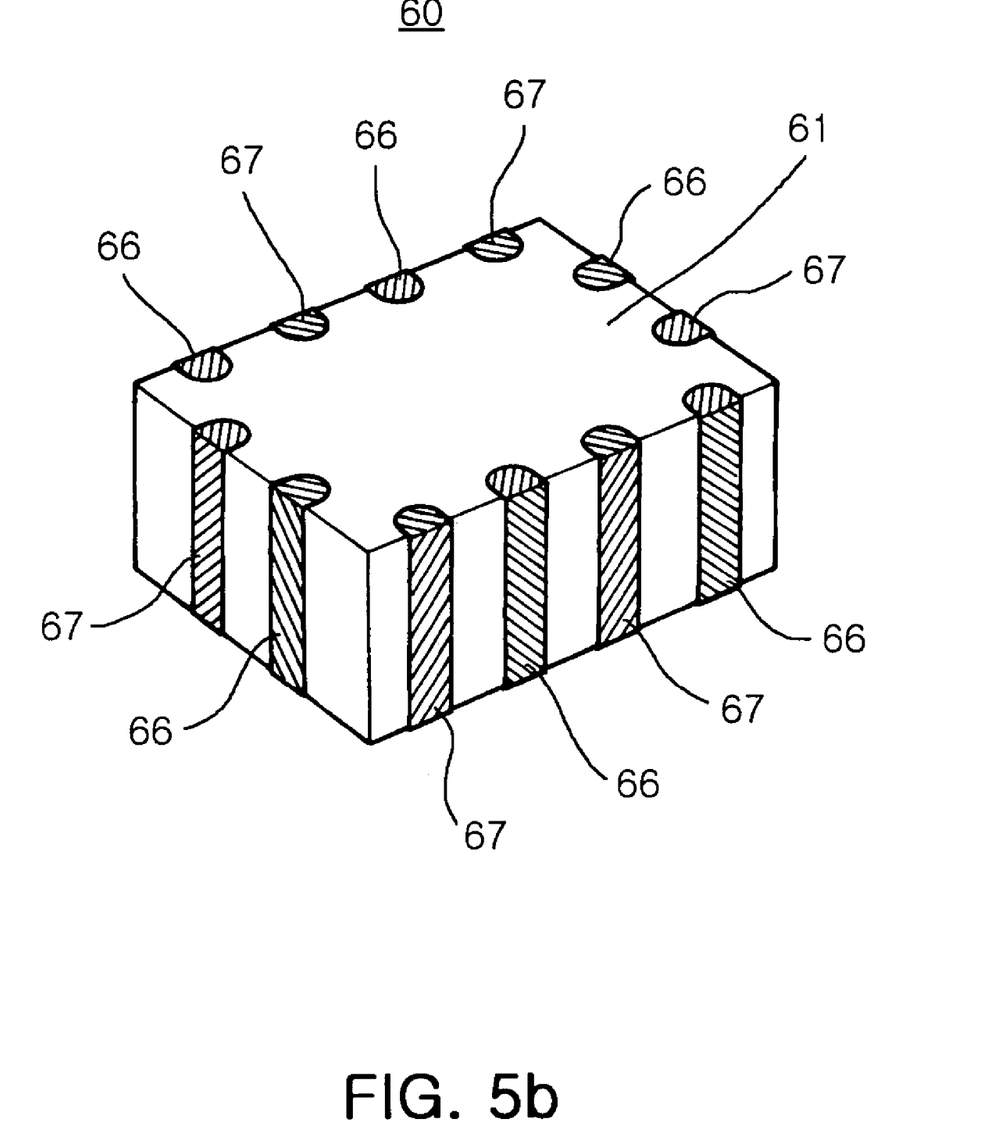
FIG. 5b is a perspective view of the multi-layer chip capacitor in accordance with yet another embodiment of the present invention.

FIG. 5b is a perspective view of the multi-layer chip capacitor 60 manufactured by the dielectric layers 12, 13, and 14 respectively provided with the electrodes 62, 63, 72, and 73. As shown in FIG. 5b, twelve terminal electrodes 66 and 67 are formed on a capacitor body 61. The terminal electrodes 66 exhibit the positive polarity (+), and the terminal electrodes 67 exhibit the negative polarity (−). Similarly to the above-described earlier embodiments, the multi-layer chip capacitor 60 of this embodiment does not have leads of the internal electrodes. Further, the conductive vias having different polarities are adjacent to each other and alternate with each other, thereby canceling out the magnetic fluxes flowing along the conductive vias. Accordingly, the multi-layer chip capacitor has a very low ESL.

Although the preferred embodiments of the present invention have been disclosed for illustrative purposes, those skilled in the art will appreciate that various modifications, additions and substitutions are possible, without departing from the scope and spirit of the invention as disclosed in the accompanying claims. For example, the number and positions of the openings formed through the internal electrodes of the multi-layer chip capacitor may be modified. Further, the number of the terminal electrodes of the multi-layer chip capacitor may be modified.

What is claimed is:

1. A multi-layer chip capacitor comprising:
a capacitor body formed by stacking a plurality of dielectric layers;
a plurality of first and second internal electrodes respectively formed on the dielectric layers, the first and second internal electrodes being separated by the dielectric layers and alternately arranged inside the capacitor body, wherein each of the internal electrodes has at least one opening formed at one or more sides thereof;
first and second conductive vias, vertically extended to pass through the openings of the second and first internal electrodes, respectively, so as not to contact peripheral edges of the openings, the first and second conductive vias being electrically connected to the first and second internal electrodes, respectively;

first and second terminal electrodes formed on one or more side faces of the capacitor body, the first and second terminal electrodes having a first polarity and a second polarity opposite to the first polarity, respectively; and first and second lowermost electrode patterns being coplanar on a dielectric layer inside the capacitor body, each of the patterns including a via contact portion and a lead portion extending therefrom, the first and second lowermost electrode patterns being electrically connected to the first and second terminal electrodes of the opposite polarities, respectively, through the respective lead portions of the lowermost electrode patterns, wherein the first and second conductive vias are in contact with the via contact portions of the first and second lowermost electrode patterns, respectively, and electrically connected to the first and second terminal electrodes through the first and second lowermost electrode patterns, respectively.

2. The multi-layer chip capacitor as set forth in claim 1, wherein each of the first and second internal electrodes has the openings of the same number formed at two opposite sides thereof, and the openings of the first internal electrodes are adjacent to and alternate with the openings of the second internal electrodes.

3. The multi-layer chip capacitor as set forth in claim 2, wherein each of the first and second internal electrodes has four openings formed at the two opposite sides thereof.

4. The multi-layer chip capacitor as set forth in claim 1, wherein each of the first and second internal electrodes has the openings of the same number formed at three sides thereof, and the openings of the first internal electrodes are adjacent to and alternate with the openings of the second internal electrodes.

5. The multi-layer chip capacitor as set forth in claim 4, wherein one side out of the three sides of the first internal electrode is opposite to one side out of the three sides of the second internal electrode.

6. The multi-layer chip capacitor as set forth in claim 5, wherein two openings are formed at each of two opposite sides out of the three sides of each of the first and second internal electrodes, and one opening is formed at the remaining one side out of the three sides of each of the first and second internal electrodes.

7. The multi-layer chip capacitor as set forth in claim 1, wherein each of the first and second internal electrodes has the openings of the same number formed at four sides thereof, and the openings of the first internal electrodes are adjacent to and alternate with the openings of the second internal electrodes.

8. The multi-layer chip capacitor as set forth in claim 7, wherein two openings are formed at each of two opposite sides out of the four sides, and one opening is formed at each of the remaining opposite two sides out of the four sides.

9. The multi-layer chip capacitor as set forth in claim 1, wherein the total number of the terminal electrodes is eight.

10. The multi-layer chip capacitor as set forth in claim 9, wherein four terminal electrodes are formed at each of two opposite sides of the capacitor body.

11. The multi-layer chip capacitor as set forth in claim 1, wherein the total number of the terminal electrodes is ten.

12. The multi-layer chip capacitor as set forth in claim 11, wherein four terminal electrodes are formed at each of two opposite sides of the capacitor body, and one terminal electrode is formed at each of the remaining two opposite sides of the capacitor body.

13. The multi-layer chip capacitor as set forth in claim 1, wherein the total number of the terminal electrodes is twelve.

14. The multi-layer chip capacitor as set forth in claim 13, wherein four terminal electrodes are formed at each of two opposite sides of the capacitor body, and two terminal electrodes are formed at each of the remaining two opposite sides of the capacitor body.

15. The multi-layer chip capacitor as set forth in claim 1, further comprising uppermost electrode patterns having the same pattern shape as that of the lowermost electrode patterns.

16. The multi-layer chip capacitor as set forth in claim 15, wherein the uppermost electrode patterns respectively include via contact portions contacting the conductive vias, and lead portions connected to the terminal electrodes.

17. The multi-layer chip capacitor as set forth in claim 1, wherein each of the first and second internal electrodes is free of a lead.

18. The multi-layer chip capacitor as set forth in claim 1, wherein the lowermost electrode patterns are free of an internal electrode substantially contributing to capacitance.

* * * * *